United States Patent [19]

Veeneman et al.

[11] 4,001,451
[45] Jan. 4, 1977

[54] PROCESS FOR DEEP FAT FRYING COMESTIBLES IN AN AUTOMATIC DEEP FAT FRYER

[75] Inventors: John L. Veeneman; Marion E. Thomas; Harry R. Deveraux, all of Idaho Falls, Idaho

[73] Assignee: American Potato Company, San Francisco, Calif.

[22] Filed: May 7, 1975

[21] Appl. No.: 575,325

Related U.S. Application Data

[60] Continuation of Ser. No. 379,298, July 16, 1973, abandoned, which is a division of Ser. No. 251,611, May 8, 1972, Pat. No. 3,776,126.

[52] U.S. Cl. .................................. 426/438; 99/360
[51] Int. Cl.² ......................................... A23L 1/10
[58] Field of Search ........... 426/550, 637, 438–441, 426/524; 99/403–410

[56] References Cited

UNITED STATES PATENTS

| | | | |
|---|---|---|---|
| 3,474,726 | 10/1969 | Curtin | 99/404 |
| 3,645,196 | 2/1972 | Johnston | 99/404 |

*Primary Examiner*—Norman Yudkoff
*Assistant Examiner*—Martin G. Mullen
*Attorney, Agent, or Firm*—Townsend and Townsend

[57] ABSTRACT

A process for automatically preparing french fries comprising the steps of cooking french fry shaped pieces of potato dough in a hot oil contained in an imperforate container having a drum shaped basket having a perforate cylindric wall and opposed overlapping arcuate segments which rotate to provide a tumbling agitation of said pieces, to insure uniform contact with said oil, which is interrupted for a time sufficient to complete the cooking of said pieces which thereafter are drained of any excess oil prior to transferring the drained pieces to a holding area.

6 Claims, 8 Drawing Figures

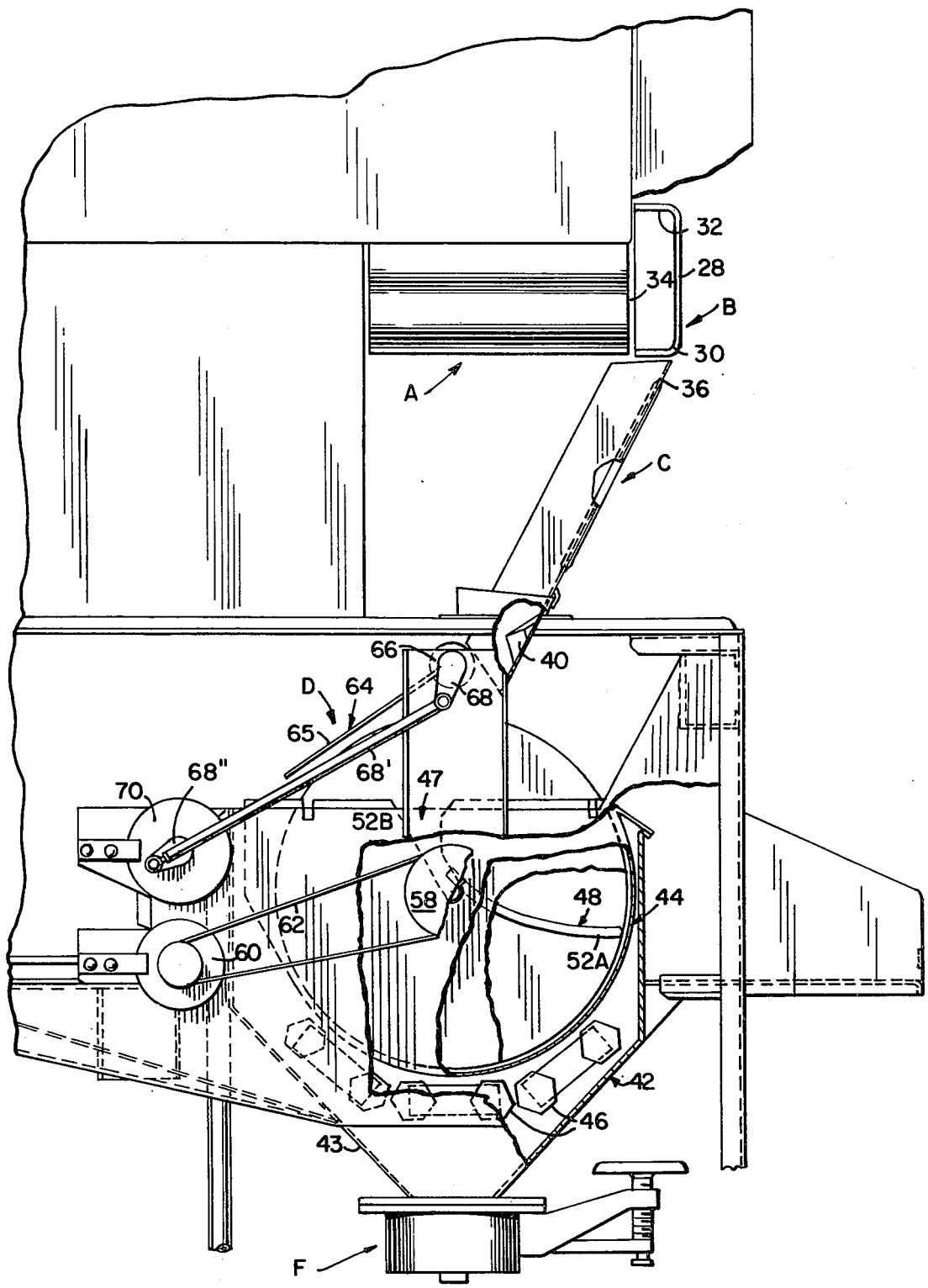
FIG_1

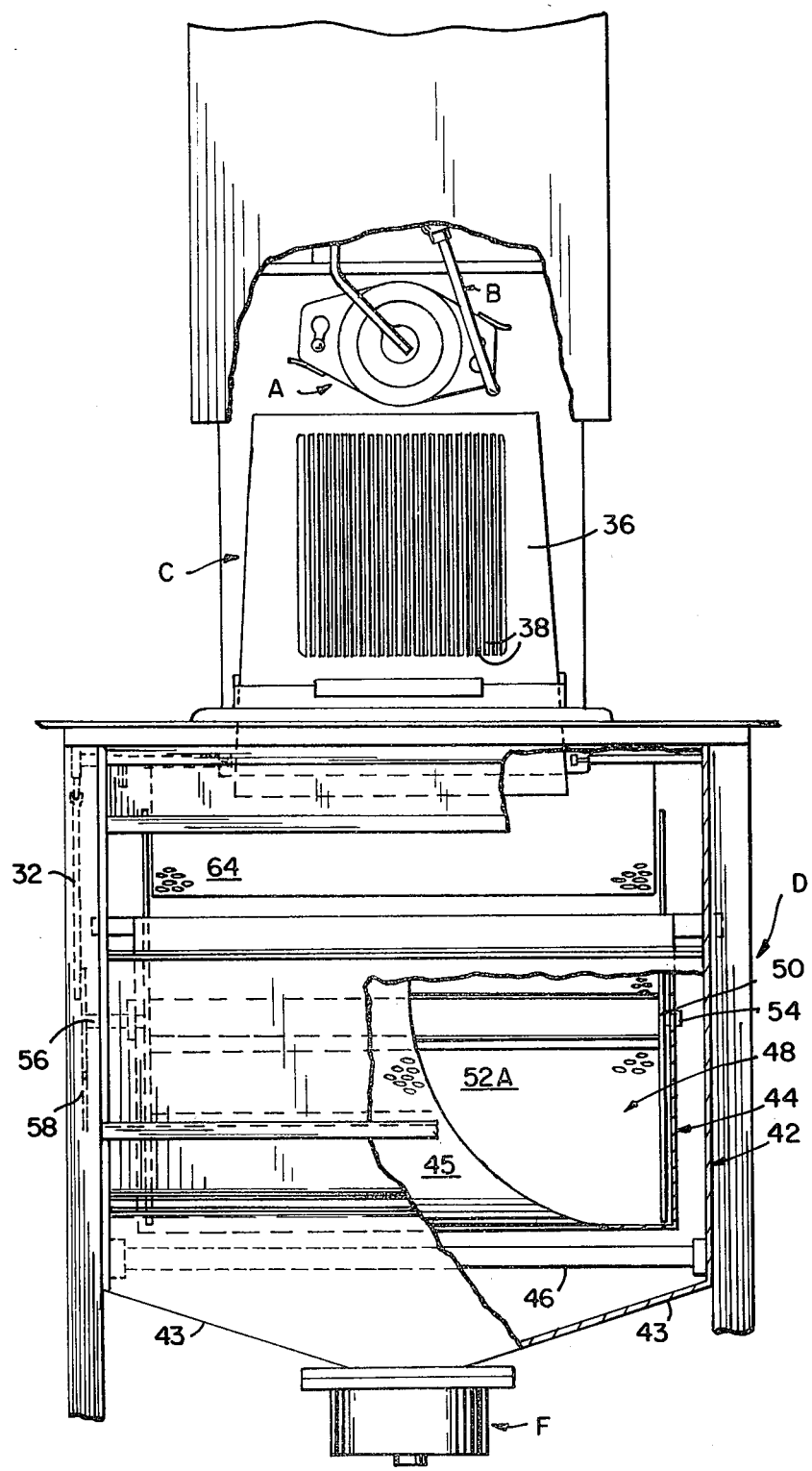
FIG_2

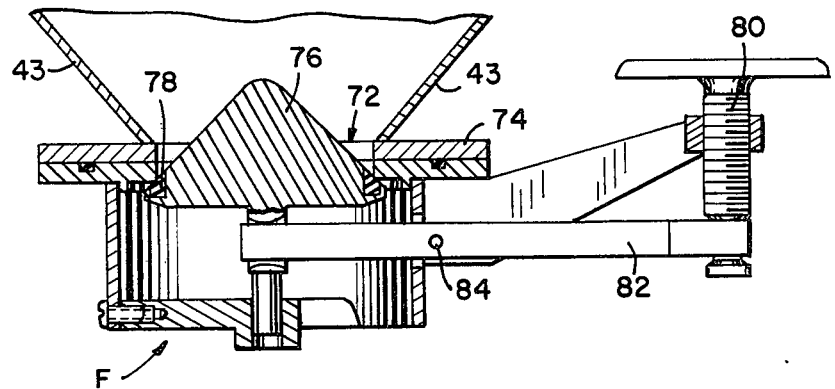
FIG_3
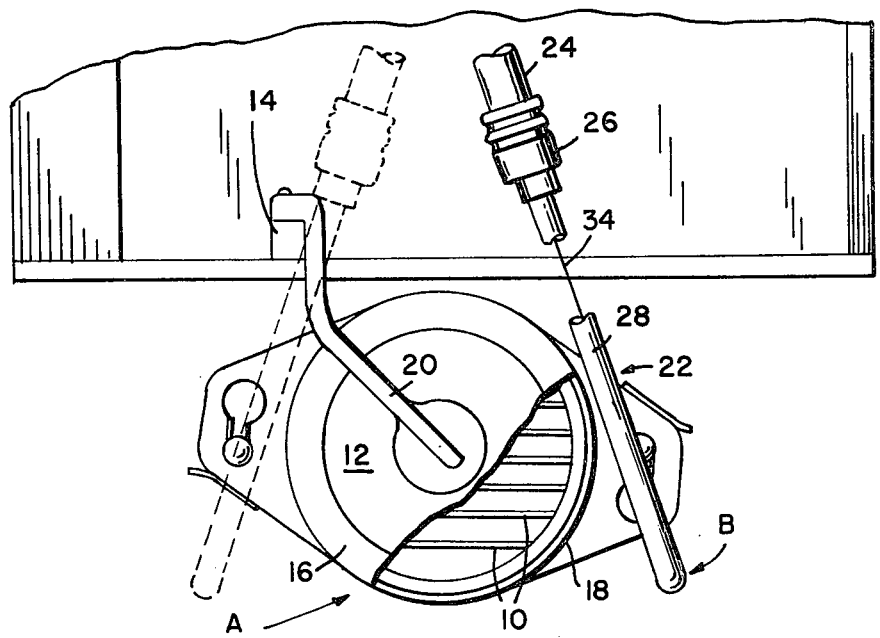
FIG_4

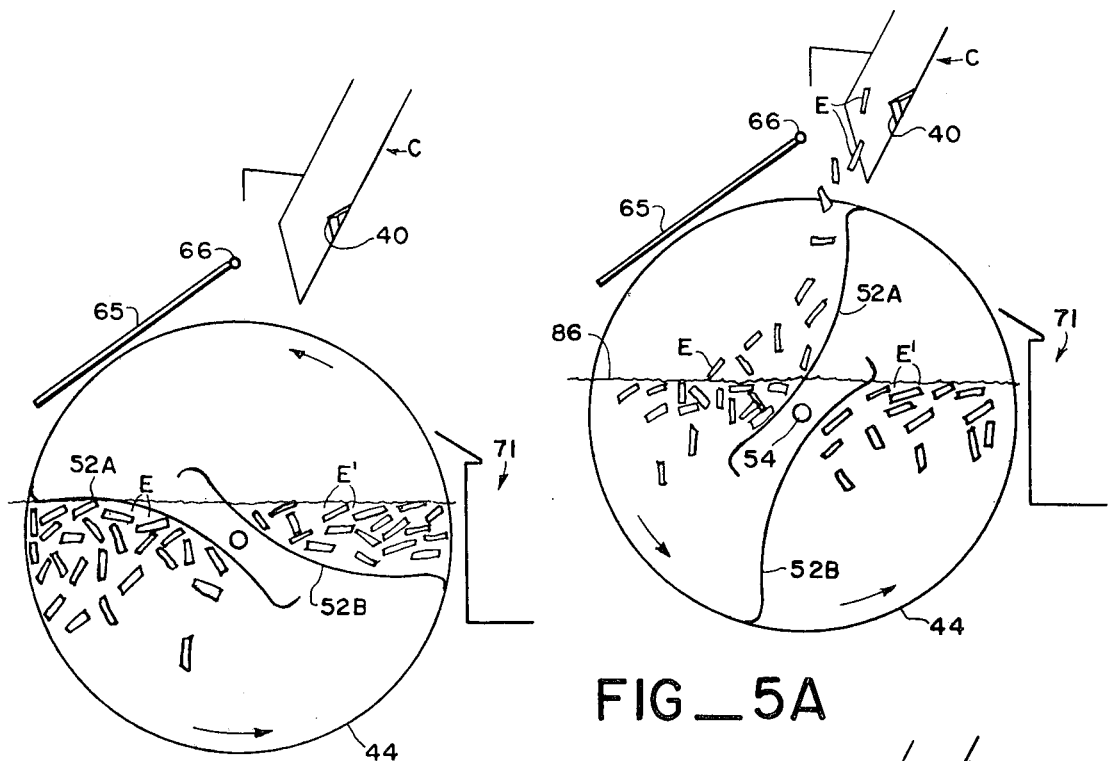
FIG_5A
FIG_5B
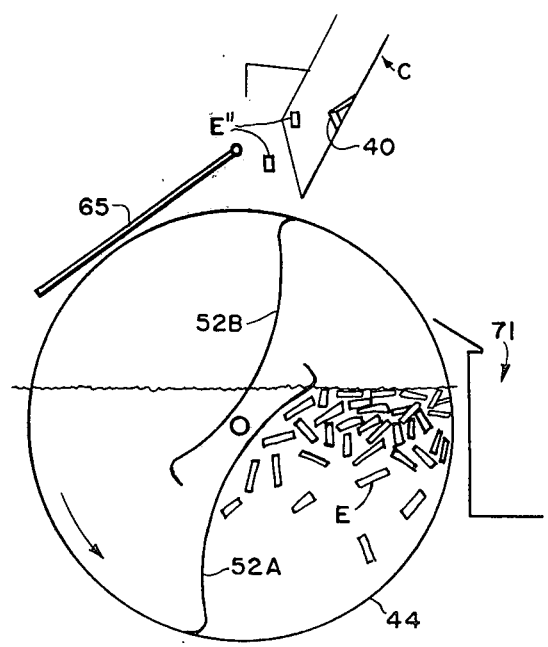
FIG_5D
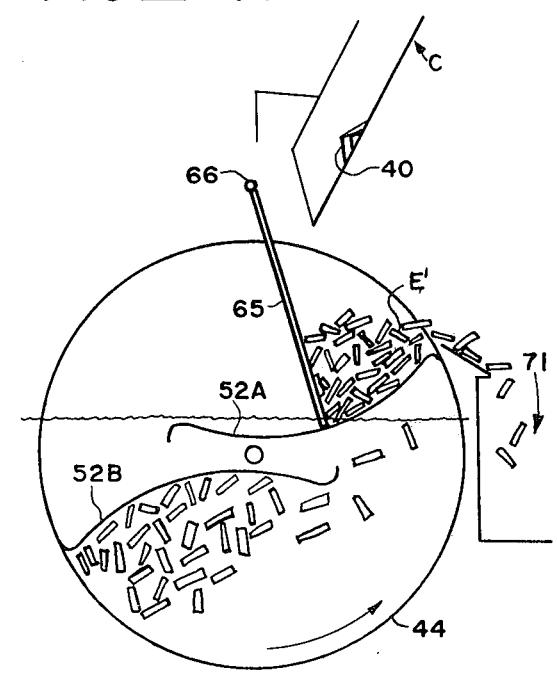
FIG_5C

PROCESS FOR DEEP FAT FRYING COMESTIBLES IN AN AUTOMATIC DEEP FAT FRYER

This is a continuation of application Ser. No. 379,298, filed July 16, 1973, and now abandoned, which is a divisional of U.S. Ser. No. 251,611, filed May 8, 1972, now U.S. Pat. No. 3,776,126.

This invention relates to apparatus for automatically and continuously deep fat frying potato pieces such as those in the conventional french fry cut form. The invention is particularly suited to the pre-determined timed treatment of dried potato product reconstituted as homogeneous potato dough and shaped into french fry cut potato pieces by the apparatus disclosed in U.S. Pat. No. 3,605,647, issued Sept. 29, 1971 or in co-pending U.S. patent application Ser. No. 170,164, filed Aug. 9, 1971. The disclosure of the above-identified patent application is incorporated herein by reference for its disclosure of relevant subject matter. The apparatus is equally suited for frying all types of food products, as well as various potato products, such as french fries made from raw potatoes or for the finish frying in the frozen state or after thawing of frozen parfried potatoes made from raw potatoes as well as similar products fabricated from potato dough.

An object of the present invention is to provide an improved deep fat frying device that employs a timed cycle to automatically convert shaped pieces of reconstituted potato dough into cooked french fries, thereby enabling a person of only moderate skill to operate the device. Apparatus of the type embodying the present invention is arranged to receive a preselected quantity of shaped potato dough pieces, retain the dough pieces in a heated zone of cooking oil for a preselected period of time, thereafter drain excess cooking oil from the pieces and remove them from the cooking zone. The apparatus includes conventional timing circuits so that the foregoing cycle can be repeated as frequently as dough pieces are introduced into the hot oil zone.

Another object of the present invention is to provide a mechanism for removing the cooked french fry potato pieces from the deep fat fryer following advancement of the dough pieces through the bath of hot oil and retention above the hot oil to enable excess oil to drain back into the bath. This object is achieved in part by providing a liquid impervious container into which an open top semi-cylindrical perforate basket is suspended. In addition, a generally diametrally extending perforate plate is mounted for rotation about the central axis of the basket in such a manner that the perforate plate sweeps the dough pieces through the hot oil.

Another object of the present invention is to provide a mechanism for moving the reconstituted french fry shaped potato dough pieces through a hot oil bath to accomplish the prescribed amount of cooking. This object is achieved in part by providing a pair of rotatable perforated rotor blades adapted to be periodically driven in a timed sequence so as to advance the aforementioned potato pieces from the point of gravitational feed input to removal therefrom. A factor present in the instant invention that contributes to the formation of particularly desirable cooked french fried pieces is that the pieces prepared by employing the apparatus of this invention are of uniformly high quality.

It is a further object of the present invention to provide a zone of hot oil wherein water escaping from the heated dough pieces in the form of steam is readily separated from the hot oil. This is accomplished by utilizing a blower and hood to withdraw steam from the general area of the automatic fryer. Steam venting has the additional advantage of also removing vaporized oil, thus preventing build-up of solidified oil on the various components of the apparatus. By providing a tank structure with inwardly sloping walls, dough fines such as crumbs will rapidly gravitate toward the removal valve, with inherent improved separation. The configuration of the crumb valve of this invention is such that on being opened it provides for the rapid removal of crumb loaded hot oil.

In another aspect of the invention, heating elements corresponding in length to the width of the hot oil tank are arranged in an arcuate configuration around the semi-cylindrical outer surface of the perforated basket. The hot oil, conventionally maintained at a cooking temperature of 350° F, distributes heat from the heating elements to the dough pieces. The inwardly sloping walls of the oil-containing tank are preferably spaced from the perforate basket by distance in excess of the cross sectional dimension of the heating elements, but no greater than about three times the cross sectional dimension of the heating elements. The arrangement of heating elements is sufficient to afford oil circulation therearound and to transfer the heat energy from the heating elements to comestibles within the perforated basket. Moreover, this arrangement minimizes the amount of oil required for proper cooking of pieces in the perforate basket.

It is another object of the present invention to provide apparatus that is easily disassembled and cleaned.

In another aspect of the invention, the activation of the rotor blades prevents the freely floating dough pieces from sticking together as they are tumbled during the rotational advancement of the blades during the cooking process. Such tumbling simulates manual shaking, thereby insuring complete and uniform contact of the hot oil with the surface of each french fry body. In a preferred form of the invention there are two rotor blade segments that are radially spaced from the axis of rotation thereof so as to define a space therebetween to enhance oil circulation. Because the inner edges of the rotor blade segments overlap one another and because the rotor is driven in only on direction, no comestible bodies can pass through the space between the blades.

It is another object of the present invention to provide an apparatus wherein rapid introduction and removal of the french fry bodies from the hot oil bath provides a uniform cooking time. A large portion of the water evaporated from the french fry pieces is quickly converted into steam which in bubbling up through the hot oil bath provides the additional advantage of cleaning and purifying the oil.

Thus, according to the present invention, a plurality of potato dough pieces are gravitationally deposited in a cylindrically shaped perforate basket immersed in a tank of hot oil. The potato dough pieces are advanced through and out of the oil bed by the rotation of one of a pair of generally diametrically extending perforate plates. Once the cooking step has been completed, the position of the perforate plates is adjusted so that the cooked pieces are retained thereon above the hot oil for an additional brief period of time during which the excess oil is allowed to drain back into the oil bath. Thereafter, the drained, cooked dough pieces are mechanically removed from the perforate plate. During the draining and removal steps, rotational advancement of the perforate plate is temporarily interrupted.

Other objects, features and advantages of the present invention will be more apparent after referring to the following specification and accompanying drawings in which:

FIG. 1 is a side view of a preferred embodiment with portions broken away;

FIG. 2 is an end view of FIG. 1 with portions broken away;

FIG. 3 is an enlarged cross sectional view of the lower valve assembly of FIG. 1;

FIG. 4 is an enlarged view of a french fry forming unit; and

FIGS. 5A, 5B, 5C and 5D are schematic views depicting the sequential operation of the preferred embodiment of FIGS. 1–4.

Referring more particularly to the drawings, a dough-containing chamber A has adjacent the outlet opening thereof a dough cutting mechanism B, illustrated in more detail in FIG. 4. Dough in chamber A is urged toward the cutting mechanism B, as more fully described in the patent application cited hereinabove, from whence it falls through deflector chute C into automated fryer D.

Referring now to FIG. 4, dough cutting mechanism B is mounted adjacent the opening in dough-containing chamber A and includes a plurality of parallel wires 10. The dough separating mechanism B separates the dough into shaped pieces as the dough is ejected from dough-containing chamber A. For sealing chamber A during introduction of the dough constituents thereinto and during the time required for the constituents to set into a relatively firm dough, as more fully described in the patent application cited herein-above, a seal plate 12 is provided. This seal plate 12 moves toward and away from the open end of chamber A when seal plate operating rod 14 is activated. The inner face of seal plate 12 is preferably resilient so as to afford a water-tight seal. A suitable arrangement is the provision of a resilient annular insert or ring 16 along the inner surface of seal plate 12. A cylindrical frame 18 has an outer edge congruent to resilient annular ring 16, so that when the seal plate is in a closed position, chamber A is sealed.

Cylindrical frame 18 is suitably retained in position on the end of chamber A and carries wires 10 in spanning relation of the opening of chamber A. Seal plate 12 is supported at its approximate center by arm 20, which arm is carried on the outer end of seal plate operating rod 14. Operating rod 14 is supported exterior of chamber A for movement along an axial path parallel to the central axis of chamber A in a manner more fully described in the patent application cited herein-above.

Transverse dough cutter 22 is disposed to swing back and forth so as to separate into french fry shaped bodies the dough portions protruding beyond wires 10. The transverse dough cutter is mounted on a pivot shaft (not shown) for movement about an axis that is generally vertically aligned above the central axis of chamber A. Transverse cutter 22 includes an arm 24 that is mounted rigidly to the pivot shaft. To the free end of arm 24, a releasable connector 26 mounts a cutter frame 28 to the arm. From arm 24, fingers 30 and 32 (shown on FIG. 1) extend inwardly toward the wires 18. Spanning the inner end of fingers 30 and 32 is a single taunt wire 34 that separates that portion of the dough that protrudes from chamber A through the spaces between wires 18, when it is advanced across the ejected dough.

As is shown schematically in FIG. 5A, french fry bodies E are separated from the dough mass protruding from chamber A and fall by gravity into and through french fry deflector chute C. As seen most clearly in FIGS. 1 and 2, deflector chute C includes a rectangular cross sectional opening and is of substantially greater width than the diameter of chamber A. The lowermost side 36 of chute C is formed so as to provide a plurality of elongated openings 38 that allow for the separation of crumbs or other small dough particles from the french fry bodies being formed by dough cutting mechanism B. Near the egress of chute C and integral with the internal surface of side 36 is bull nose 40 of triangular cross section for diverting the french fry bodies E falling generally down the center of chute C toward the outermost edges of chute C so that more uniform distribution within fryer D is accomplished.

Automatic fryer D comprises an outer liquid impervious tank 42 including inwardly sloping walls 43 extending to a lower end defined by crumb valve F described in more detail hereinafter with reference to FIG. 3. Disposed within open top liquid impervious container (tank) 42 is a drum-shaped basket 44 having a perforate cylindric wall 45 extending in excess of 180° therearound to an open top. Disposed below basket 44 and generally tangential to the outer surface of basket 44 are a plurality of heating elements 46. Supported in slots 47 formed in the end walls of basket 44 and mounted for rotation within basket 44 is a generally diametrally extending blade assembly 48 having imperforate ends 50 for providing rigidity to perforate rotor blades 52A and 52B. Rotor blades 52A and 52B are mounted on axis 54 that is supported by basket 44 in slots 47. Axis 54 extends beyond the extremes of basket 44 at one end 56 for a distance sufficient for attachment of pulley 58. As shown most clearly in FIG. 1, pulley 58 is in driving engagement with pulley 60 through belt 62 for advancing assembly 48 counter-clockwise with respect to FIG. 1. Pulley 60 is driven from a power source (not shown) and controlled by conventional timing circuits (also not shown).

Although french fry bodies E are gravitationally fed to fryer D, removal therefrom involves both mechanical advancement of blade assembly 48 and synchronized activation of perforate plate assembly 64. Plate assembly 64 includes perforate plate 65 mounted on axis 66 for reciprocal movement tangential with respect to axis 54 about which blades 52A and 52B are rotated. Plate 65 is driven about axis 66 through pivotally-engaged linking members 68, 68' and 68" which are in turn driven by the rotation of wheel 70. Wheel 70 in turn is rotatably driven from a power source not shown. Suitable conventional timing circuits (not shown) are provided to provide the interaction of rotor blade assembly 48 with plate assembly 64 when potato dough bodies E are released from cutting mechanism B and gravitationally descend through deflector chute C.

Referring now to FIG. 3, liquid impervious container 42 includes a circular opening 72 formed at the lowermost portion thereof wherein inwardly sloping sides 43 converge. Sides 43 are provided with a circular flange 74 surrounding opening 72 and against which valve 76 is adapted to abut in fluid-tight engagement. Conically shaped abut-off valve 76 includes O-ring 78, formed of a pliable material such as teflon, for accomplishing liquid impervious engagement with circular flange 74 when advanced into contact therewith. Advancement and withdrawal of valve 76 from engagement with flange 74 is accomplished by advancing or retracting, respectively, threaded shaft 80 which in turn causes lever arm 82 to pivot about its fulcrum 84. Blades 52A and 52B, plate 65 and the cylindrical surface 45 of drum-shaped basket 44 are all advantageously formed of 18 gauge stainless steel with ¼-inch diameter perforations staggered on ⅜-inch centers. Such perforations maximize oil retention and return thereof to the bath, thereby extending the useful life of the oil and minimizing waste. Rotor blades 52A and 52B are preferably arranged to provide a 1/16-inch clearance between their outer ends and the internal surface of perforated wall 45. Similarly, plate 65 is formed to provide slight clearance with the french fry body bearing surface of either blade 52A or 52B when positioned for interaction with plate 65.

Turning now to schematic drawings 5A, 5B, 5C and 5D, to illustrate the operation of the apparatus of this invention, dough containing chamber A and cutting mechanism B are activated to provide dough bodies E to fryer D. Perforate blade 52A is maintained in alignment with the lowermost side 36 of the rectangular opening in deflector chute C so as to guide french fry bodies E into basket 44 filled with hot oil having an upper surface level 86 (FIG. 5A). Perforate blade 52A is then rotatably advanced approximately 90° (or 450°) and thereafter temporarily stopped while the cooking of french fry bodies E' from a previous batch is completed, as illustrated in FIG. 5B. Perforate blade 52A is then advanced approximately an additional 30° so as to advance french fry bodies E' to a location above the surface 86 of the hot oil where the french fry pieces are allowed to drain substantially free of excess oil. Of course, while french fry bodies E' are being drained of excess oil, french fry bodies E remain in the hot oil bath and are subjected to additional cooking.

Once the draining operation has been completed, plate 65 is advanced tangential to the concave surface of perforate blade 52A to sweep french fry bodies E' into holding basket 71. The device of this invention is formed so that the pivot point 66 for plate 65 coincides with the center of curvature of the concave surface of both of perforate blades 52A and 52B, so that the reciprocal movement of plate 65 will at all times be uniformly spaced relative to the surface of the perforate blades (and generally tangential thereto) to insure that all french fry bodies are removed. As shown in FIG. 5D, once bodies E are removed from blade 52A, plate 65 is returned to its inoperative position and the perforate blades are again rotatably advanced to the position corresponding to FIG. 5A to allow for the introduction of a subsequent batch of french fry bodies E''.

In a typical cycle, blades 52A and 52B are retained in the position shown in FIG. 5A for a period of approximately 5 seconds while dough is dispensed from chamber A through cutting mechanism B and allowed to drop through deflector chute C into the hot oil. Pulley 60 is then energized to advance blades 52A and 52B through one and one quarter revolutions (at a rate of approximately 12 seconds per revolution). This tumbling, cooking step requires 15 seconds, wherein baffle blades 52A and 52B reach the position illustrated by schematic FIG. 5B. Cooking is thereafter continued for an additional 12 seconds while blades 52A and 52B remain stationary. Pulley 60 is then activated for 2 seconds to move the paddles approximately 30° to the unloading position where the center of curvature of blade 52A coincides with the pivot point of plate 65. The french fries are then allowed to drain for 4 seconds and thereafter swept ahead of plate 65 into holding basket 71, an action requiring approximately 6 additional seconds. Then blade 52A is returned to the original position illustrated by FIG. 5A wherein further french fries are introduced for sequential treatment.

What is claimed is:
1. A process for deep fat frying comestible bodies comprising the steps of:
    a. forming said bodies of desired size;
    b. providing within an imperforate container a drum-shaped basket having a perforate cylindric wall extending more than 180° and having an open top, said basket having first and second opposed overlapping arcuate segments mounted for rotation about a center axis corresponding to about the center axis of said basket, said segments each having a corresponding radius of curvature;
    c. supplying cooking oil heated to about 350° F to said container in an amount sufficient to cover comestible bodies when held submerged by said arcuate segments when in a horizontal position;
    d. introducing a first lot of said formed comestible bodies into said cooking oil while said first arcuate segment is in substantially vertical position;
    e. rotatably advancing said first segment through one and one quarter revolutions to provide tumbling agitation of said comestible bodies and advance said comestible bodies to a position where the first arcuate segment holds said comestible bodies submerged in said oil to partially cook them;
    f. interrupting said rotatable advancement for a time sufficient to complete the cooking of said comestible bodies within said oil;
    g. further advancing said first segment about 30° until the second arcuate segment is above the oil surface so as to allow a previous lot of comestibles thereon to be drained of excess oil;
    h. discharging said previous lot of drained comestible bodies by sweeping them peripherally from the upper surface of said second segment;
    i. further advancing said second segment to a substantially vertical position to allow the introduction of a second uncooked lot of comestible bodies while said first lot continues to cook;
    j. further advancing said second segment through one and one quarter revolutions to a point where said second segment is in a horizontal position allowing said first and second lots to further cook;
    k. further advancing said second segment about 30° to a point where said first lot of completely cooked comestible bodies on said first segment is above the oil surface and allowed to drain;
    l. discharging said first lot of cooked comestible bodies from said first segment by sweeping them peripherally from the upper surface thereof;
    m. advancing said first segment about 60° to the position described in step d); and
    n. repeating process steps d) through i) to produce subsequent lots of cooked comestible bodies.

2. A process in accordance with claim 1 in which said shaped pieces are selected from a group consisting of raw potato pieces, frozen parfried pieces processed from raw potato, frozen parfried pieces shaped from potato dough, and thawed previously frozen potato pieces.

3. A process in accordance with claim 2 wherein the rate of rotational advancement of said segments is approximately 12 seconds per revolution.

4. A process in accordance with claim 1 wherein advancing said arcuate segments through 1¼ revolution requires 15 seconds.

5. A process in accordance with claim 4 wherein said interruption of the advancement of said segments requires an additional 12 seconds.

6. A process in accordance with claim 1 wherein the discharging of said pieces is accomplished by the pivotal movement of means mounted exterior to said basket at a point defining the center of curvature of said segments, when either of said segments is stopped to allow draining of said excess oil from said cooked pieces.

* * * * *